(12) United States Patent
Uematsu et al.

(10) Patent No.: US 9,347,394 B2
(45) Date of Patent: May 24, 2016

(54) FUEL INJECTION CONTROL SYSTEM

(71) Applicant: HONDA MOTOR CO., LTD., Tokyo (JP)

(72) Inventors: Hideki Uematsu, Wako (JP); Masato Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 14/226,821

(22) Filed: Mar. 27, 2014

(65) Prior Publication Data

US 2014/0290624 A1 Oct. 2, 2014

(30) Foreign Application Priority Data

Mar. 29, 2013 (JP) ................................. 2013-072834

(51) Int. Cl.
*F02D 41/30* (2006.01)
*F02D 41/34* (2006.01)
*F02D 41/40* (2006.01)

(52) U.S. Cl.
CPC .......... *F02D 41/3005* (2013.01); *F02D 41/345* (2013.01); *F02D 41/3064* (2013.01); *F02D 41/34* (2013.01); *F02D 41/402* (2013.01); *F02D 2200/021* (2013.01); *F02D 2200/0414* (2013.01); *F02D 2200/703* (2013.01); *F02D 2250/21* (2013.01); *Y02T 10/44* (2013.01)

(58) Field of Classification Search
CPC ... F02D 41/30; F02D 41/3005; F02D 41/345; F02D 41/34; F02D 41/402; F02D 2200/703; F02D 2250/21; F02D 2200/0414; Y02T 10/44
See application file for complete search history.

(56) References Cited

U.S. PATENT DOCUMENTS

| 6,484,689 B1 * | 11/2002 | Hasegawa | F02D 41/403 123/299 |
| 6,722,345 B2 * | 4/2004 | Saeki | F02D 35/023 123/299 |
| 7,082,926 B2 * | 8/2006 | Sadakane | F02B 7/02 123/299 |

FOREIGN PATENT DOCUMENTS

JP 2009-144649 7/2009

* cited by examiner

*Primary Examiner* — Hieu T Vo
(74) *Attorney, Agent, or Firm* — Mori & Ward, LLP (57) ABSTRACT

A fuel injection control system includes an engine speed detector, a throttle opening degree detector, a fuel injection device, a fuel injection controller, a fuel injection number determining device, and a fuel injection mode setting device. The engine speed detector is configured to detect an engine speed (NE). The throttle opening degree detector is configured to detect a throttle opening degree (TH). The fuel injection device is configured to inject fuel. The fuel injection controller is configured to calculate, based on an injection amount map, a fuel injection amount of the fuel to be injected from the fuel injection device and is configured to control the fuel injection device to inject the fuel according to the calculated fuel injection amount.

9 Claims, 7 Drawing Sheets

FUEL INJECTION CONTROL SYSTEM

CROSS-REFERENCE TO RELATED APPLICATIONS

The present application claims priority under 35 U.S.C. §119 to Japanese Patent Application No. 2013-072834, filed Mar. 29, 2013, entitled "Fuel Injection Control System." The contents of this application are incorporated herein by reference in their entirety.

BACKGROUND OF THE INVENTION

1. Field of the Invention

The present invention relates to a fuel injection control system.

2. Discussion of the Background

Japanese Patent Application Publication No. 2009-144649 describes a fuel injection control system configured to perform a fuel injection in a basic injection amount on the basis of change in a throttle opening degree as well as an additional fuel injection on the basis of the amount of change in the throttle opening degree.

SUMMARY OF THE INVENTION

According to one aspect of the present invention, a fuel injection control system includes an engine speed detector, a throttle opening degree detector, a fuel injection device, a fuel injection controller, a fuel injection number determining device, and a fuel injection mode setting device. The engine speed detector is configured to detect an engine speed (NE). The throttle opening degree detector is configured to detect a throttle opening degree (TH). The fuel injection device is configured to inject fuel. The fuel injection controller is configured to calculate, based on an injection amount map, a fuel injection amount of the fuel to be injected from the fuel injection device and is configured to control the fuel injection device to inject the fuel according to the calculated fuel injection amount. The fuel injection number determining device is configured to determine based on the throttle opening degree (TH) detected by the throttle opening degree detector and the engine speed (NE) detected by the engine speed detector whether a frequency of fuel injections during one cycle of an engine is to be one or two. The one cycle of the engine has a predetermined number of divided injection stages including a first predetermined injection stage, a second predetermined injection stage after the first predetermined injection stage, and a third predetermined injection stage. The fuel injection mode setting device, in a case where the frequency of fuel injections determined by the fuel injection number determining device is switched from one to two, is configured to set an injection mode to a two-time fuel injection transition mode in which an injection timing is gradually advanced every predetermined number of cycles while the frequency of fuel injections is kept at one and is configured to set the injection mode from the two-time fuel injection transition mode to a two-time fuel injection mode, when the injection timing is shifted to the first predetermined injection stage, in which the frequency of fuel injections is set to two so that the first injection timing is kept in the first predetermined injection stage and an additional injection timing is set in the second predetermined injection stage after the first predetermined injection stage, and in a case where the frequency of fuel injections determined by the fuel injection number determining device is switched from two to one, the fuel injection mode setting device is configured to set the injection mode to a one-time fuel injection transition mode in which the frequency of fuel injections is set to one and the injection timing is gradually delayed from the first predetermined injection stage every predetermined number of cycles and the fuel injection mode setting device is configured to set the injection mode from the one-time fuel injection transition mode to a one-time fuel injection mode when the injection timing returns to the third predetermined injection stage. The fuel injection controller is configured to control the fuel injection device according to the fuel injection mode set by the fuel injection mode setting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A fuel injection control system of the embodiment of the present invention is described below in detail by showing a preferable embodiment and by referring to the attached drawings.

Figure 1:
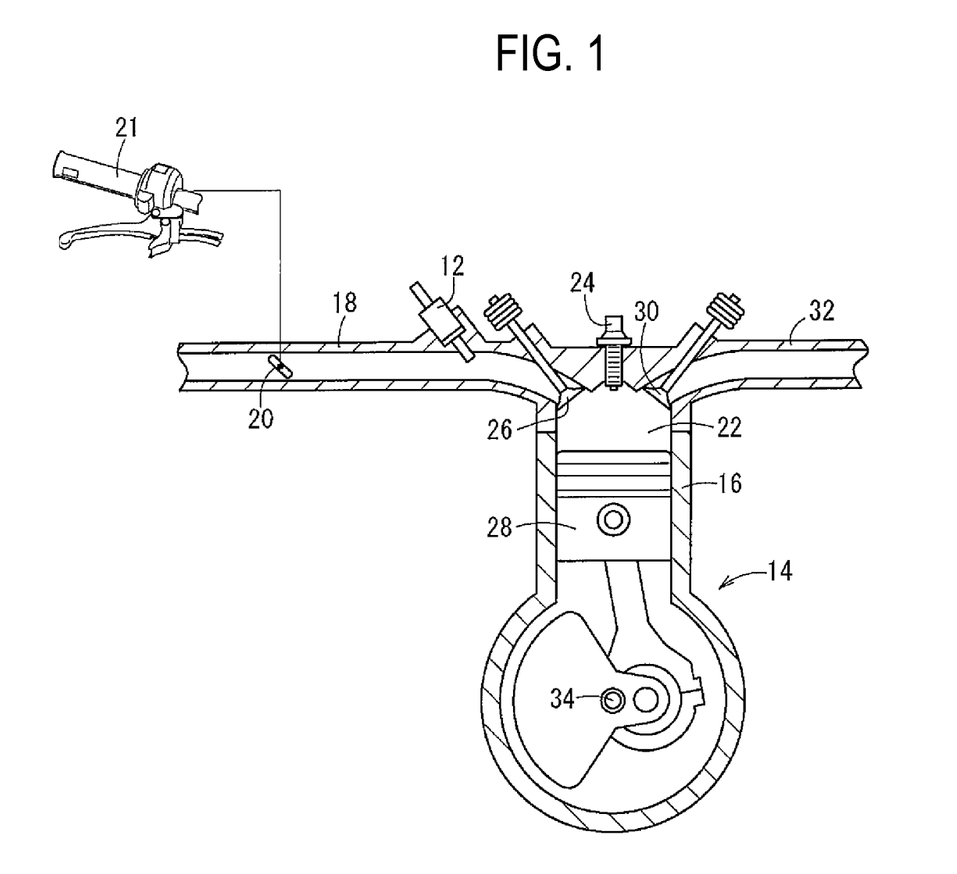
FIG. 1 is a configuration diagram of a single-cylinder four-stroke engine provided with an injector which is a control target of a fuel injection control system.

FIG. 1 is a configuration diagram of a single-cylinder four-stroke engine 14 provided with an injector (fuel injection device) 12 which is a control target of a fuel injection control system 10. Note that the engine 14 may be a multi-cylinder engine. An intake pipe 18 connected to a cylinder 16 of the engine 14 is provided with a throttle valve 20 configured to adjust an amount of air to be taken into the cylinder 16 and the injector (fuel injection device) 12 configured inject fuel into the air having passed the throttle valve 20. Injecting the fuel into the air vaporizes the fuel and an air-fuel mixture is thereby produced. The opening degree of the throttle valve 20 (throttle opening degree) increases as the opening degree of an accelerator grip 21 of a vehicle increases. The cylinder 16 is provided with a spark plug 24 for causing the air-fuel mixture in a combustion chamber 22 to explode.

An intake valve 26 is provided in the cylinder 16 and the fuel air mixture in the intake pipe 18 flows into the combustion chamber 22 of the cylinder 16 while the intake valve 26 is open (intake stroke). A piston 28 descends as the air-fuel mixture flows into the combustion chamber 22. After the air-fuel mixture flows into the combustion chamber 22, the piston 28 rises and the air-fuel mixture in the combustion chamber 22 is thereby compressed (compression stroke). Thereafter, ignition of the spark plug 24 provided in the cylinder 16 causes the compressed air-fuel mixture to explode and the piston 28 descends while being accelerated (combustion stroke). When the piston 28 rises again, an exhaust valve 30 is opened and an exhaust gas in the combustion chamber 22 is exhausted from an exhaust pipe 32 (exhaust stroke). This up-down movement of the piston 28 rotates a crankshaft 34 of the engine 14. Note that, in the case where the engine 14 is a multi-cylinder engine, the timings of the intake stroke, the compression stroke, the combustion stroke, and the exhaust stroke vary among the cylinders. Accordingly, the ignition timing of the spark plug 24 also varies among the cylinders 16.

Figure 2:
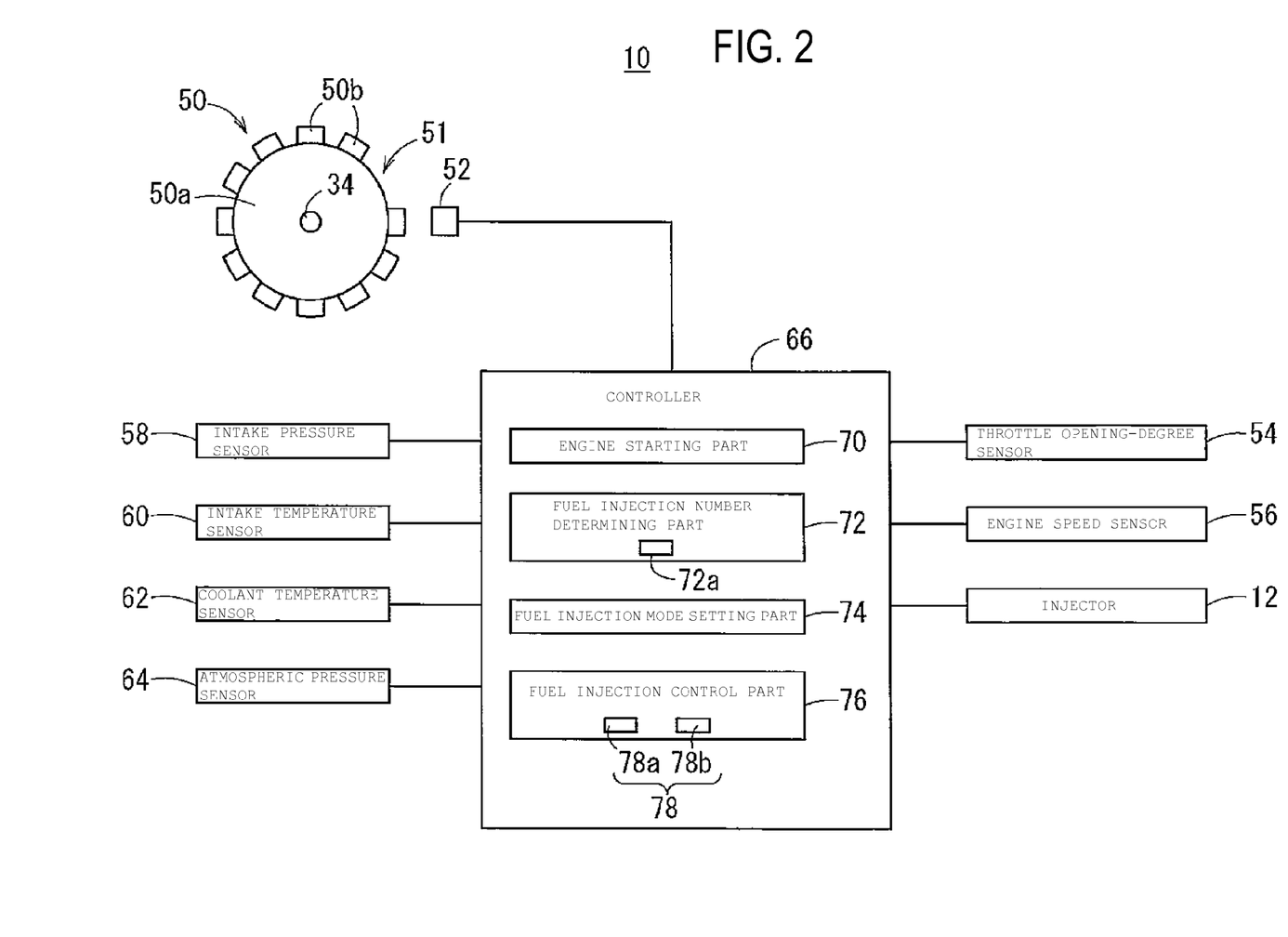
FIG. 2 is a configuration diagram of the fuel injection control system.

FIG. 2 is a configuration diagram of the fuel injection control system 10. The fuel injection control system 10 includes the injector 12, a crank pulser rotor 50, a pulse generator 52, a throttle opening-degree sensor 54, an engine speed sensor 56, an intake pressure sensor 58, an intake temperature sensor 60, a coolant temperature sensor 62, an atmospheric pressure sensor 64, and a controller 66.

The crank pulser rotor 50 rotates integrally with the crankshaft 34 and has a toothless portion 51. Specifically, the crank pulser rotor 50 is formed of a disc-shaped rotor 50a and eleven teeth 50b which are protruding portions provided on an outer periphery of the rotor 50a. The teeth 50b are arranged at intervals of 30° and the angle of the toothless portion 51 is 60°. The pulse generator 52 detects the teeth 50b to generate and output crank pulses.

The throttle opening-degree sensor 54 detects the opening degree (rotation angle) TH of the throttle valve 20. The engine speed sensor 56 detects the number of revolutions (hereafter, referred to as engine speed) NE of the crankshaft 34 of the engine 14. The intake pressure sensor 58 and the intake temperature sensor 60 are provided in the intake pipe 18 and detects the air pressure PB and the intake temperature TA of the air to be taken into the cylinder 16. The coolant temperature sensor 62 detects the coolant temperature TW of the engine 14 and the atmospheric pressure sensor 64 detects the atmospheric pressure PA.

The controller 66 controls the injector 12 on the basis of the crank pulses generated by the pulse generator 52 and detections signals from the throttle opening-degree sensor 54, the intake temperature sensor 60, the intake pressure sensor 58, the atmospheric pressure sensor 64, and the coolant temperature sensor 62.

The controller 66 includes an engine starting part 70, a fuel injection number determining part 72, a fuel injection mode setting part 74, and a fuel injection control part 76. The engine starting part 70 starts the engine 14 and determines injection stages to be described later. The fuel injection number determining part 72 determines whether the number of fuel injections is to be one or two, on the basis of the opening degree TH of the throttle valve 20 (hereafter, referred to as throttle opening degree), the engine speed NE, the intake temperature TA, the coolant temperature TW, and the atmospheric pressure PA. The fuel injection mode setting part 74 sets an injection mode to one of a one-time fuel injection mode, a two-time fuel injection transition mode, a two-time fuel injection mode, and a one-time fuel injection transition mode, on the basis of a determination result of the fuel injection number determining part 72. The fuel injection control part 76 has an injection amount map 78. The fuel injection control part 76 calculates a fuel injection amount by using the injection amount map 78 and drives the injector 12 to make the injector 12 inject fuel, according to the injection mode set by the fuel injection mode setting part 74.

Figure 3:
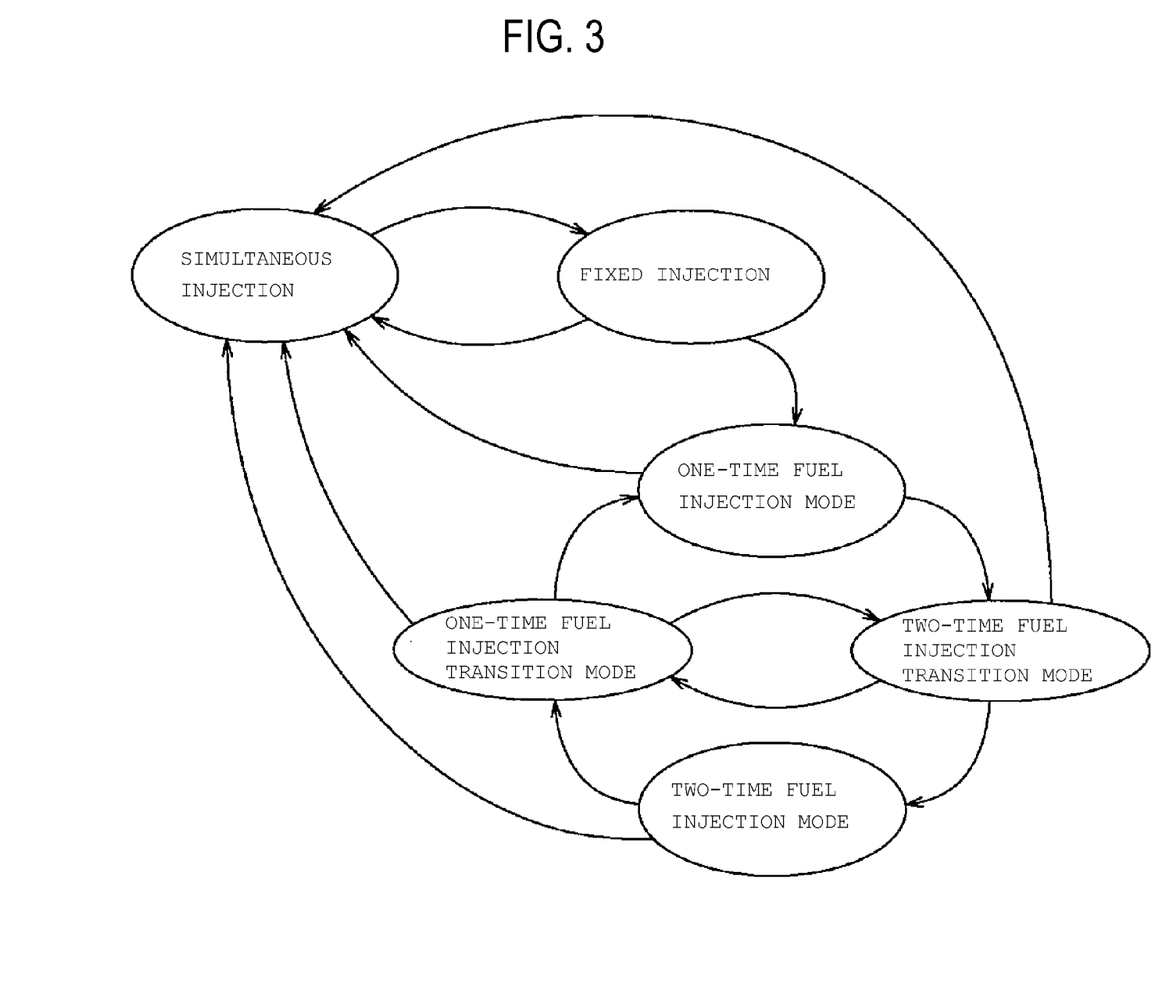
FIG. 3 is a view showing the overall operation of the fuel injection control system.

Next, an overall operation of the fuel injection control system 10 is briefly described. FIG. 3 is a view showing the overall operation of the fuel injection control system 10. In engine start in cases such as where the engine 14 stops due to engine stall or the like, the engine starting part 70 performs simultaneous injection in which the fuel injection is performed for the cylinder 16. The simultaneous injection is a process in which the injection is performed regardless of the rotating position of the crankshaft 34. The fuel is injected by this simultaneous injection and the engine 14 enters the combustion stroke, thereby causing the crankshaft 34 to rotate. The crank pulse is sent from the pulse generator 52 along with this rotation of the crankshaft 34 and the engine starting part 70 determines a reference position of the crankshaft (hereafter, referred to as a crank reference position). In the embodiment, the engine starting part 70 determines the crank reference position at a time point when the twelve crank pulses are detected or a time point when the toothless portion 51 is detected, and determines cranking stages to be described later. Note that, when the crank reference position is undeterminable, the simultaneous injection is performed again.

The cranking stages (360° stages) are stages obtained by dividing one rotation of the crankshaft 34 into eleven parts at output timings of the crank pulses from the pulse generator 52, and the cranking stages of "0" to "10" are assigned to respective phases of the crankshaft 34.

In the four-stroke engine 14, the crankshaft 34 rotates once in the two strokes of the intake stroke and the compression stroke and rotates once in the two strokes of the combustion stroke and the exhaust stroke. Accordingly, the crankshaft 34 rotates twice in the four strokes (one cycle) of the intake stroke, the compression stroke, the combustion stroke, and the exhaust stroke. Thus, the type of the stroke cannot be determined even when the crank reference position is determined. Hence, the engine starting part 70 performs fixed injection once at a predetermined timing to determine the type of the stroke by observing change in the intake pressure, and determines cycle stages and the injection stages.

Figure 4:
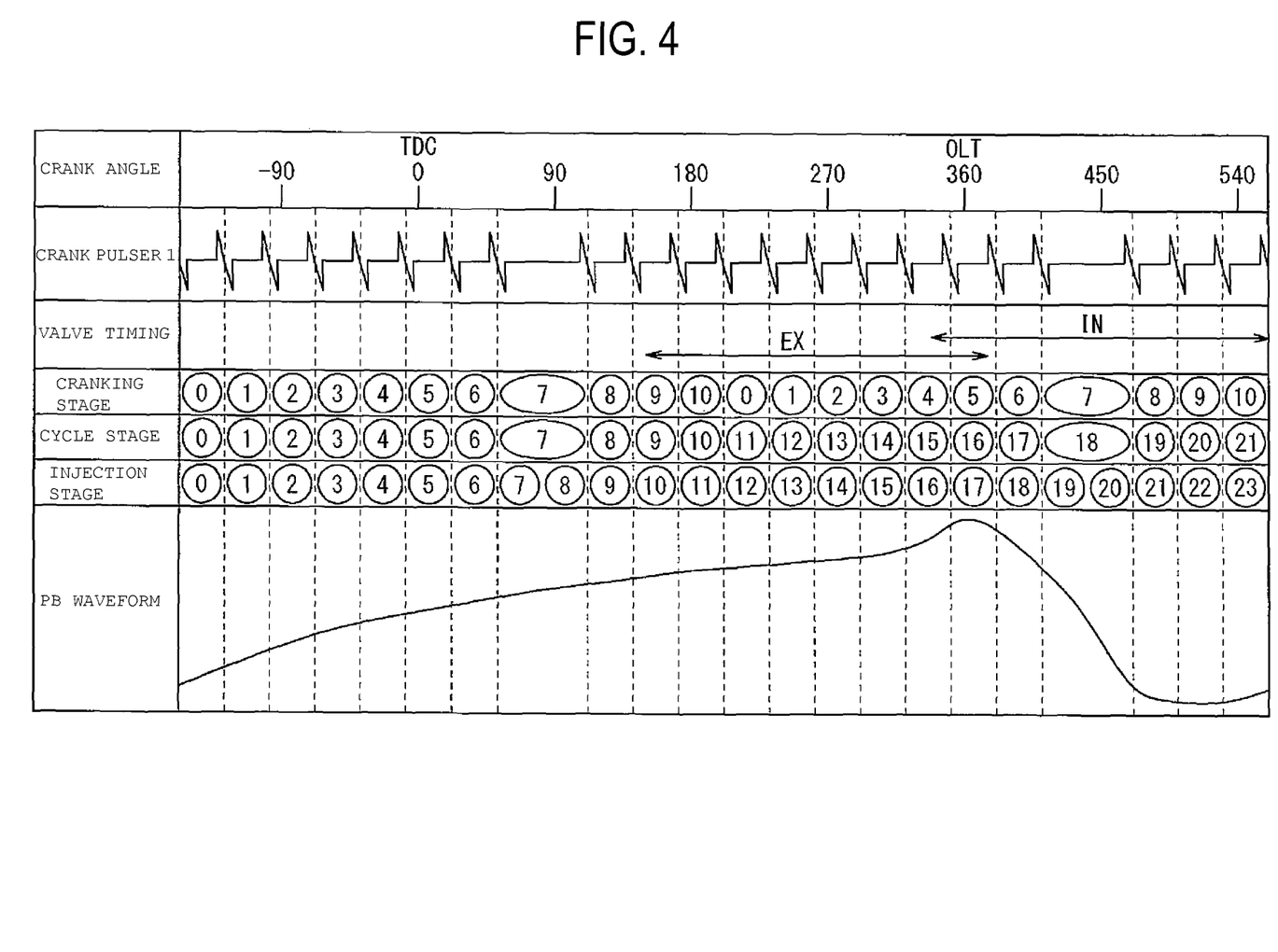
FIG. 4 is a view showing a timing chart of cranking stages, cycle stages, injection stages, and an intake pressure corresponding to a rotation angle (crank angle) of a crankshaft.

As shown in FIG. 4, cranking stages of the same number respectively have different values of the intake pressure and the intake pressure reaches its peak at a point of transition from the exhaust stroke to the intake stroke. The engine starting part 70 can thus determine the cycle stages and the injection stages by observing this change in the intake pressure.

The cycle stages (720° stages) are stages obtained by dividing the two rotations of the crankshaft 34 into 22 parts at the output timings of the crank pulses from the pulse generator 52, and the cycle stages of "0" to "21" are assigned to respective phases. Injection stages are stages set by dividing the toothless portion 51 into two parts and thus dividing one cycle into a predetermined number (24) of stages at equal intervals, and injection stages of "0" to "23" are assigned to respective phases. In the embodiment, the injection stages are assigned in such a way that "0" is assigned to the first injection stage in the compression stroke (injection stage immediately after the completion of the intake stroke) in order to simplify the description.

The crank angle in the top row of FIG. 4 shows the rotation angle of the crank from a predetermined angle. Positions of the top dead center (TDC) and the overlap top (OLT) of the cylinder 16 are shown in the crank angle.

The crank pulses outputted by the pulse generator 52 are shown in the row below the crank angle, and opening and closing timings of the intake valve 26 (IN) and the exhaust valve 30 (EX) of the cylinder 16 are shown in the row below the crank pulses. Furthermore, the cranking stages, the cycle stages, the injection stages, and the intake pressure are shown in the rows below the valve timings.

When the fixed injection is performed and the injection stages are assigned, as shown in FIG. 3, the fuel injection mode setting part 74 switches the injection mode to the one-time fuel injection mode (normal fuel injection mode) in which the fuel injection is performed once in one cycle of the cylinder 16. Then, when the fuel injection number determining part 72 determines to set the number of fuel injections to two, the fuel injection mode setting part 74 switches the injection mode to the two-time fuel injection mode in which the fuel injection is performed twice in one cycle of the cylinder 16. When the injection mode is switched from the one-time fuel injection mode to the two-time fuel injection mode, the injection mode is not switched directly to the two-time fuel injection mode, but is first switched to the two-time fuel injection transition mode and is then switched to the two-time fuel injection mode.

When the fuel injection number determining part 72 determines to set the number of fuel injections to one in the case where the number of fuel injections is set to two, the fuel injection mode setting part 74 switches the injection mode from the two-time fuel injection mode to the one-time fuel injection mode. When the injection mode is switched from the two-time fuel injection mode to the one-time fuel injection mode, the injection mode is not switched directly to the one-time fuel injection mode, but is first switched to the one-time fuel injection transition mode and is then switched to the one-time fuel injection mode.

When the fuel injection number determining part 72 determines to set the number of fuel injections to one in the two-time fuel injection transition mode, the fuel injection mode setting part 74 first switches the injection mode to the one-time fuel injection transition mode and then to the one-time fuel injection mode. Moreover, when the fuel injection number determining part 72 determines to set the number of fuel injections to two in the one-time fuel injection transition mode, the fuel injection mode setting part 74 first switches the injection mode to the two-time fuel injection transition mode and then to the two-time fuel injection mode. Furthermore, when the crank reference position becomes undeterminable due to stop of the engine 14 such as engine stall in the one-time fuel injection mode, the two-time fuel injection mode, the two-time fuel injection transition mode, and the one-time fuel injection transition mode, the engine starting part 70 performs the simultaneous injection and the fixed injection again to determine the injection stages.

Figure 5:
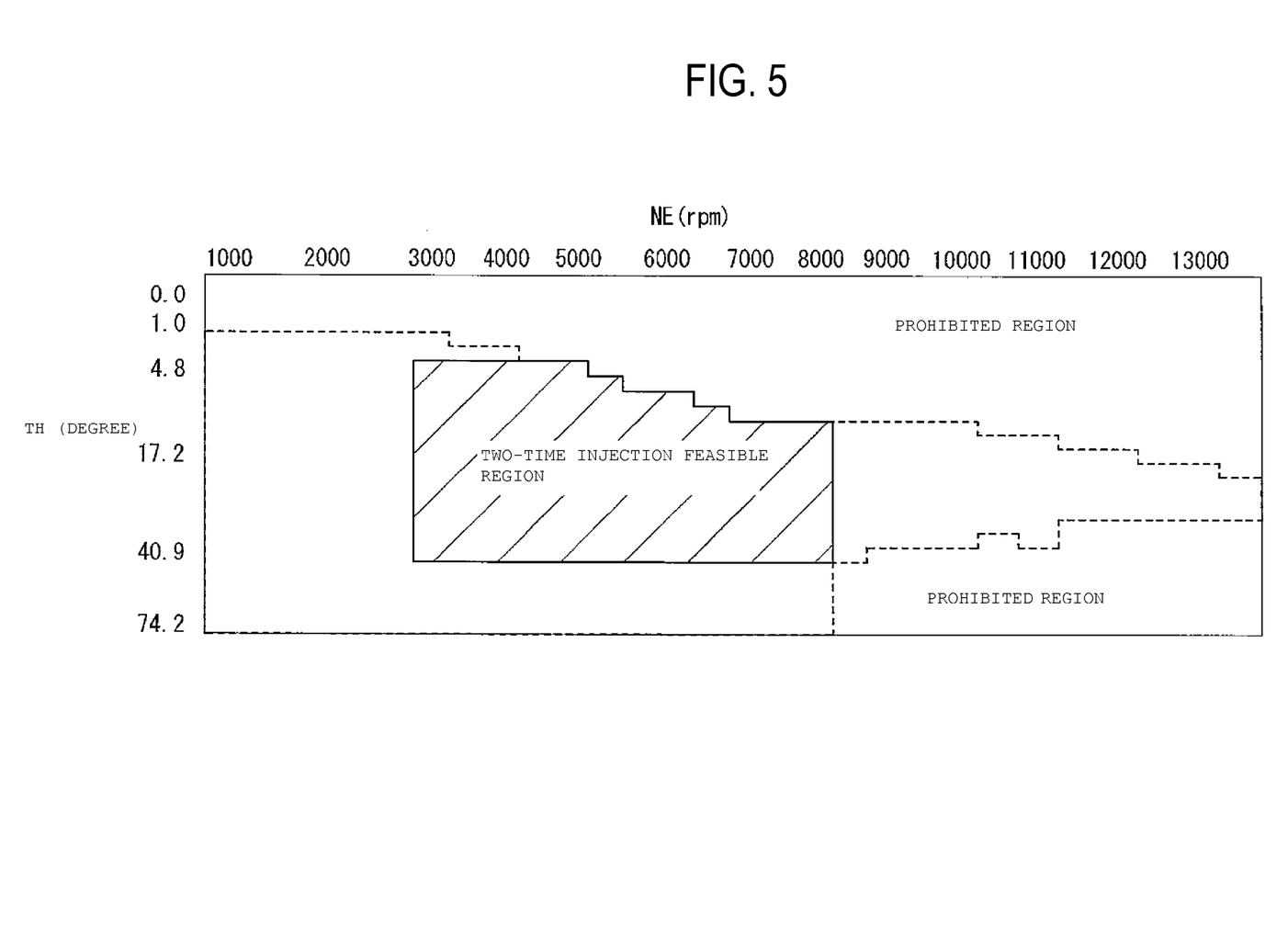
FIG. 5 is a view showing a two-time injection feasible region map.

The fuel injection number determining part 72 has a two-time injection feasible region map 72a (see FIG. 2). As shown in FIG. 5, in the two-time injection feasible region map 72a, a two-time injection feasible region (region shaded by diagonal lines) is set based on the throttle opening degree TH and the engine speed NE. Regions other than the two-time injection feasible region are prohibited regions in which the two-time injection is prohibited.

The fuel injection number determining part 72 determines to set the number of fuel injections to two when a point determined by the throttle opening degree TH and the engine speed NE is in the two-time injection feasible region and the intake temperature TA, the coolant temperature TW, and the atmospheric pressure PA satisfy predetermined conditions. Meanwhile, when the point determined by the throttle opening degree TH and the engine speed NE is outside the two-time injection feasible region, or when the point determined by the throttle opening degree TH and the engine speed NE is in the two-time injection feasible region but the intake temperature TA, the coolant temperature TW, and the atmospheric pressure PA do not satisfy the predetermined conditions, the fuel injection number determining part 72 determines to set the number of the fuel injections to one. Note that a region surrounded by the dotted lines may be set as the two-time injection feasible region.

Here, description is given of why the fuel injection is performed twice. In the aforementioned two-time injection feasible region including an intermediate speed range of the vehicle, a desired driving force of the engine 14 cannot be obtained even when the accelerator grip 21 is operated to increase the opening degree. Accordingly, the fuel injection is performed twice to increase the driving force. To be more specific, the fuel is first injected to the back side of the closed intake valve 26, at a timing far from the timing to open the intake valve 26, and the air to be taken into the cylinder 16 is thus cooled by the effect of latent heat of vaporization. Thereafter, the fuel injection is performed again while the intake valve 26 is closed. This improves the volumetric efficiency (vaporization efficiency) of the fuel, thereby increasing the driving force of the engine 14.

When the predetermined conditions are not satisfied (in a case where the intake temperature TA or the coolant temperature TW is low or a similar case), the temperature of the air to be taken into the cylinder 16 is low. Accordingly, the fuel injection is not performed twice even when the point determined by the throttle opening degree TH and the engine speed NE is in the two-time injection feasible region.

Figure 6:
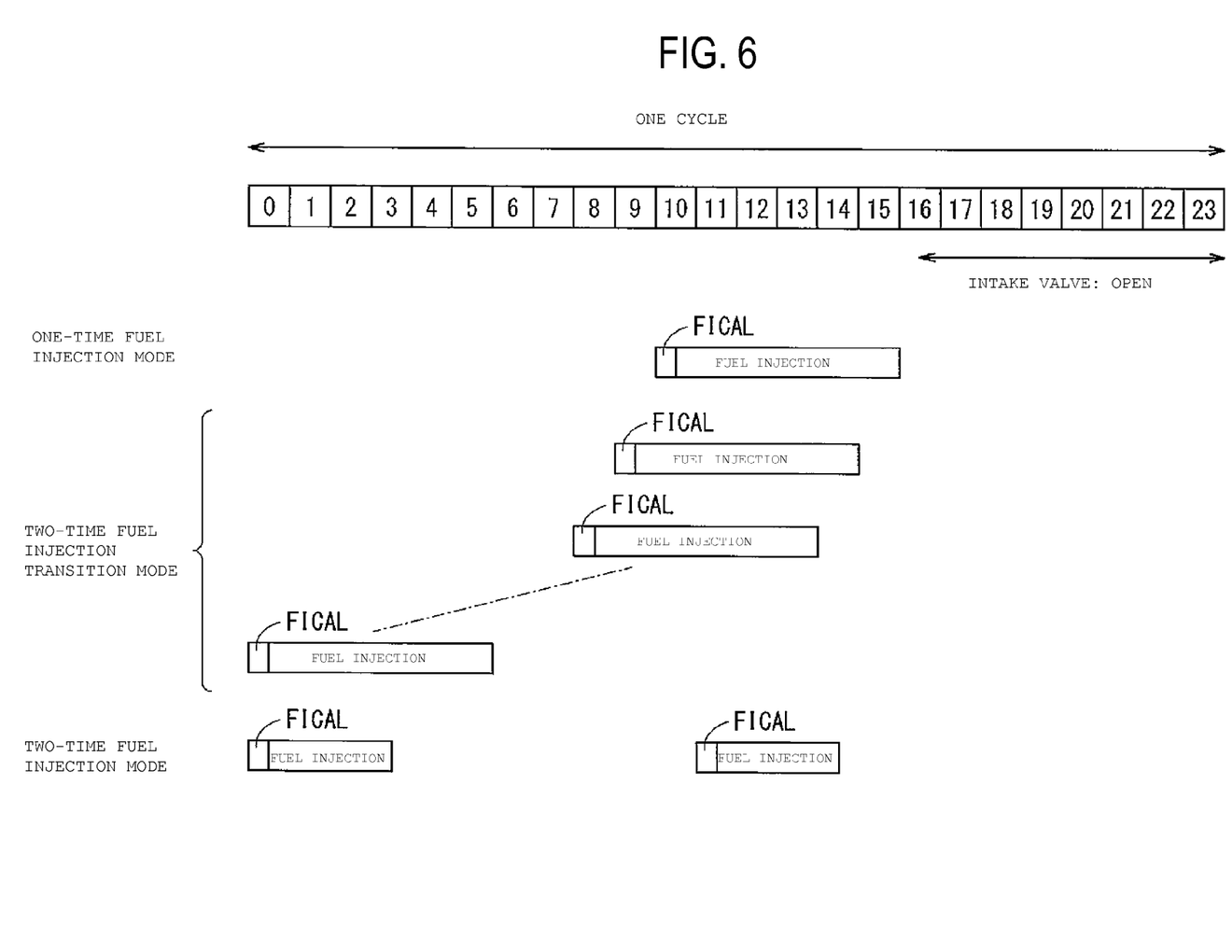
FIG. 6 is a view for explaining switching from a one-time fuel injection mode to a two-time fuel injection mode.
Figure 7:
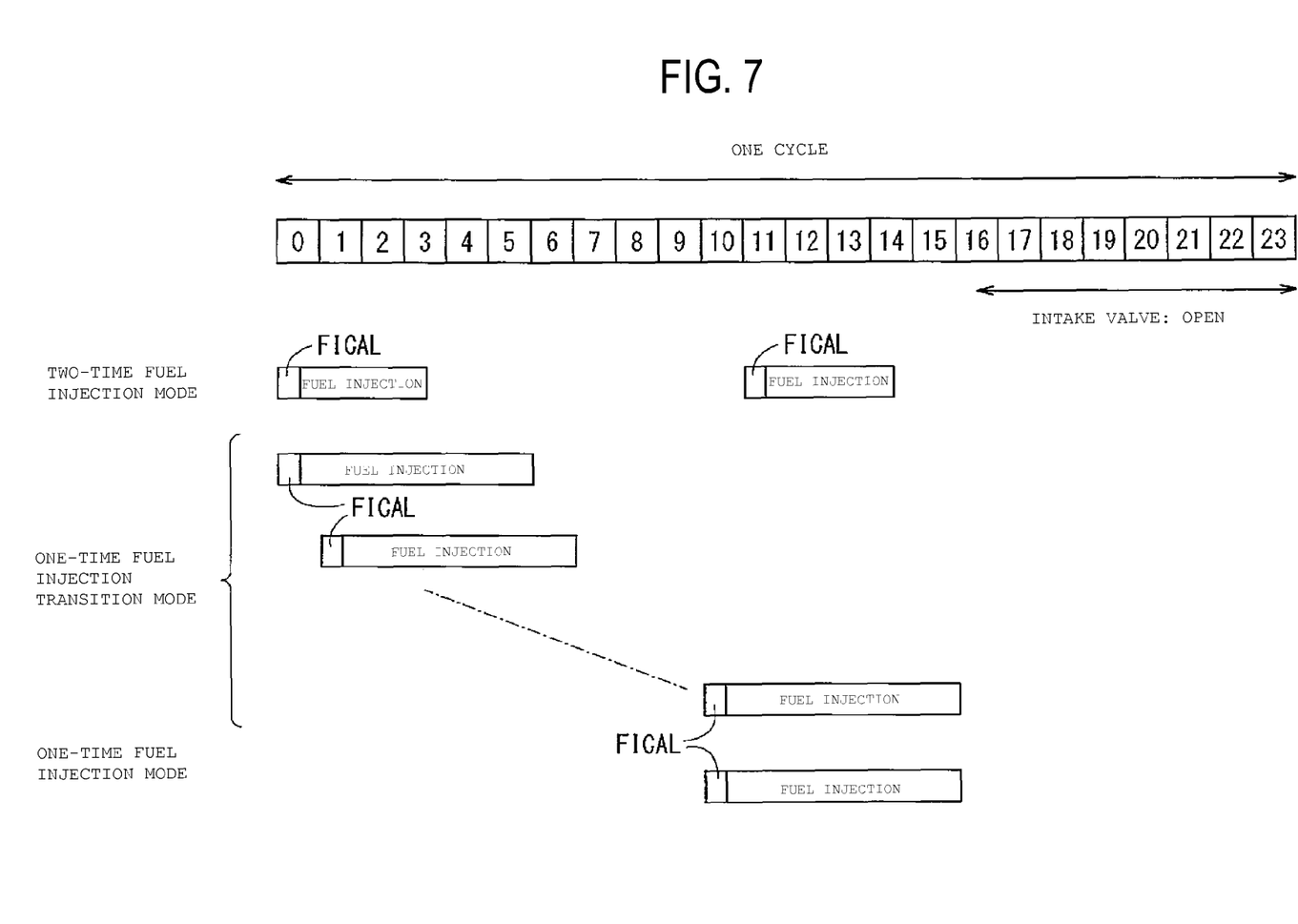
FIG. 7 is a view for explaining switching from the two-time fuel injection mode to the one-time fuel injection mode.

FIG. 6 is a view for explaining the switching from the one-time fuel injection mode to the two-time fuel injection mode and FIG. 7 is a view for explaining the switching from the two-time fuel injection mode to the one-time fuel injection mode.

As shown in FIG. 6, when the injection mode is set to the one-time fuel injection mode by the fuel injection mode setting part 74, an injection timing is set in an injection stage (hereafter, referred to as third predetermined injection stage) for the one-time fuel injection mode. The third predetermined injection stage is an injection stage before the timing at which the intake valve 26 is opened, and is explained as "10" in the embodiment. The third predetermined injection stage may be fixed or be changed depending on the throttle opening degree TH and the engine speed NE.

The fuel injection control part 76 calculates the fuel injection amount at the injection timing according to the set injection mode, and drives the injector 12 to perform the fuel injection. Specifically, in the one-time fuel injection mode, the fuel injection control part 76 calculates the fuel injection amount at the timing when the injection stage is "10", and performs the fuel injection. "FICAL" in FIGS. 6 and 7 indicates a calculation time of the fuel injection amount and "fuel injection" in FIGS. 6 and 7 indicates a fuel injection time in which the fuel injection is performed.

Thereafter, when the number of fuel injections is determined to be set to two by the fuel injection number determining part 72, the fuel injection mode setting part 74 sets the injection mode to the two-time fuel injection transition mode. As shown in FIG. 6, when the injection mode is set to the two-time fuel injection transition mode, the injection timing is set to be gradually advanced from the current injection timing every predetermined number of cycles. To be more specific, the injection timing is advanced by one injection stage every cycle in such a way that the injection stage in which the injection timing is set is shifted every cycle, from "9" to "8", to "7", to "6" and so on. Note that the injection timing can be advanced by two or more injection stages.

In the two-time fuel injection transition mode, the injection timing is advanced until the injection timing is shifted to a predetermined injection stage (hereafter, referred to as first predetermined injection stage). In the embodiment, the first predetermined injection stage is set to an injection stage farthest from the timing at which the intake valve 26 is opened, i.e. the injection stage "0". The fuel injection control part 76 calculates the fuel injection amount at the injection timing every cycle, and performs the fuel injection.

When the injection timing is shifted to the first predetermined injection stage, the fuel injection mode setting part 74 sets the injection mode to the two-time fuel injection mode. As shown in FIG. 6, when the injection mode is set to the two-time fuel injection mode, the number of fuel injections in one cycle is set to two, and the injection timing is fixed to the first predetermined injection stage while an additional injection timing is set in an injection stage (hereafter, referred to as second predetermined injection stage) after the first predetermined injection stage. The injection stage in which the additional injection timing is set is an injection stage before the timing at which the intake valve 26 is opened and is an injection stage in which a good vaporization ratio (volumetric efficiency of fuel) can be achieved. The second predetermined injection stage in which the additional injection timing is set is a fixed predetermined injection stage. In the embodiment, the second predetermined injection stage is the injection stage "11" which is one stage after the third predetermined injection stage.

In the two-time fuel injection mode, the fuel injection control part 76 calculates the first fuel injection amount at the timing of the injection stage "0", and performs the first fuel injection. Then, the fuel injection control part 76 calculates the second fuel injection amount at the timing of the injection stage "11", and performs the second fuel injection.

Thereafter, when the fuel injection number determining part 72 determines to set the number of fuel injections to one, the fuel injection mode setting part 74 sets the injection mode to the one-time fuel injection transition mode. As shown in FIG. 7, when the injection mode is set to the one-time fuel injection transition mode, the number of fuel injections in one cycle is set to one and the injection timing is set to be gradually delayed from the current injection timing every predetermined number of cycles. To be more specific, the injection timing is delayed by one injection stage every cycle in such a way that the injection stage in which the injection timing is set is shifted every cycle, from "0" to "1", to "2", to "3" and so on. Note that the injection timing can be delayed by two or more injection stages.

In the one-time fuel injection transition mode, the injection timing is delayed until the injection timing returns to the third predetermined injection stage "10". The fuel injection control part 76 calculates the fuel injection amount at the injection timing in each cycle and performs the fuel injection.

Next, description is given of the calculation of the fuel injection amount by the fuel injection control part 76. The injection amount map 78 includes a two-time injection amount map 78a used when the fuel injection is performed twice and a one-time injection amount map 78b used when the fuel injection is performed once (see FIG. 2). Although not illustrated, basic injection amounts TIMAP2, TIMAP1 corresponding to the throttle opening degree TH are stored in the two-time injection amount map 78a and the one-time injection amount map 78b.

First, description is given of calculation of a fuel injection amount TIM1 of the one-time fuel injection mode, the two-time fuel injection transition mode, and the one-time fuel injection transition mode. The fuel injection control part 76 obtains the basic injection amount TIMAP1 corresponding to the throttle opening degree TH detected by the throttle opening-degree sensor 54 at the injection timing, from the one-time injection amount map 78b.

In addition, the fuel injection control part 76 calculates an environment correction coefficient K_TOTAL by multiplying an intake temperature correction coefficient K_TA corresponding to the intake temperature TA detected by the intake temperature sensor 60 at the injection timing, a coolant temperature correction coefficient K_TW corresponding to the coolant temperature TW detected by the coolant temperature sensor 62 at the injection timing, and an atmospheric pressure correction coefficient K_PA corresponding to the atmospheric pressure PA detected by the atmospheric pressure sensor 64 at the injection timing. In other words, the fuel injection control part 76 calculates the environment correction coefficient K_TOTAL by using a relational expression of K_TOTAL=(K_TA)×(K_TW)×(K_PA).

Although not illustrated, the fuel injection control part 76 has a map storing the intake temperature correction coefficient K_TA corresponding to the intake temperature TA, a map storing the coolant temperature correction coefficient K_TW corresponding to the coolant temperature TW, and a map storing the atmospheric pressure correction coefficient K_PA corresponding to the atmospheric pressure PA, and calculates the environment correction coefficient K_TOTAL by using these maps.

The fuel injection control part 76 calculates the fuel injection amount TIM1 by multiplying the basic injection amount TIMAP1 and the environment correction coefficient K_TOTAL. In other words, the fuel injection control part 76 calculates the fuel injection amount TIM1 by using a relational expression of TIM1=TIMAP1×(K_TOTAL).

Next, description is given of calculation of a first fuel injection amount TIM2 for a first injection of the two-time fuel injection mode. The fuel injection control part 76 obtains the basic injection amount TIMAP2 corresponding to the throttle opening degree TH detected by the throttle opening-degree sensor 54 at the injection timing (in this case, the first predetermined injection stage), from the two-time injection amount map 78a. In addition, the fuel injection control part 76 calculates the environment correction coefficient K_TOTAL by multiplying the intake temperature correction coefficient K_TA corresponding to the intake temperature TA detected by the intake temperature sensor 60 at the injection timing (in this case, the first predetermined injection stage), the coolant temperature correction coefficient K_TW corresponding to the coolant temperature TW detected by the coolant temperature sensor 62 at the injection timing, and the atmospheric pressure correction coefficient K_PA corresponding to the atmospheric pressure PA detected by the atmospheric pressure sensor 64 at the injection timing.

The fuel injection control part 76 calculates the first fuel injection amount TIM2 by multiplying the basic injection amount TIMAP2, the environment correction coefficient K_TOTAL, and a predetermined injection ratio RTI. In other words, the fuel injection control part 76 calculates the first fuel injection amount TIM2 by using a relational expression of TIM2=TIMAP2×(K_TOTAL)×RTI. The predetermined injection ratio RTI is a ratio to a second fuel injection amount.

Next, description is given of calculation of the second fuel injection amount TIM3 for a second injection of the two-time fuel injection mode. The fuel injection control part 76 obtains the basic injection amount TIMAP2 corresponding to the throttle opening degree TH detected by the throttle opening-degree sensor 54 at the additional injection timing (second predetermined injection stage), from the two-time injection amount map 78*a*. In addition, the fuel injection control part 76 calculates the environment correction coefficient K_TOTAL by multiplying the intake temperature correction coefficient K_TA corresponding to the intake temperature TA detected by the intake temperature sensor 60 at the additional injection timing (second predetermined injection stage), the coolant temperature correction coefficient K_TW corresponding to the coolant temperature TW detected by the coolant temperature sensor 62 at the additional injection timing, and the atmospheric pressure correction coefficient K_PA corresponding to the atmospheric pressure PA detected by the atmospheric pressure sensor 64 at the additional injection timing.

The fuel injection control part 76 calculates the second fuel injection amount TIM3 by subtracting the first fuel injection amount TIM2 from a value obtained by multiplying the basic injection amount TIMAP2 and the environment correction coefficient K_TOTAL. In other words, the fuel injection control part 76 calculates the second fuel injection amount TIM3 by using a relational expression of TIM3=TIMAP2×(K_TOTAL)−TIM2.

Note that an injection amount obtained by adding an ineffective time correction amount TIVB to the fuel injection amount TIM1 can be used as the injection amount of the one-time fuel injection mode, the two-time fuel injection transition mode, and the one-time fuel injection transition mode. Similarly, an injection amount obtained by adding the ineffective time correction amount TIVB to the fuel injection amount TIM2 can be used as the first fuel injection amount of the two-time fuel injection mode and an injection amount obtained by adding the ineffective time correction amount TIVB to the fuel injection amount TIM3 can be used as the second fuel injection amount of the two-time fuel injection mode.

Since the fuel injection amount of the fuel outputted by the injector 12 per unit time is constant, the fuel injection amounts TIM1, TIM2, TIM3 can be expressed as fuel injection times. Moreover, when the injector 12 is driven to inject the fuel in the calculated fuel injection amount (fuel injection time) TIM1, TIM2, TIM3, there is a time lag before the fuel injection is actually started in some cases. Due to this, the actual fuel injection amount is smaller than the calculated fuel injection amount TIM1, TIM2, TIM3 even when the injector 12 is driven to inject the fuel in the calculated fuel injection amount TIM1, TIM2, TIM3. In view of this, the ineffective time correction amount TIVB is added to the calculated fuel injection amount TIM1, TIM2, TIM3, and the fuel can be thus injected in an appropriate fuel injection amount.

As described above, in the case of switching the number of fuel injections from one to two, the injection timing is gradually advanced with the number of fuel injections kept at one, until the injection timing is shifted to the first predetermined injection stage. Then, the number of fuel injections is set to two when the injection timing is shifted to the first predetermined injection stage. In the case of switching the number of fuel injections from two to one, the number of fuel injections is set to one and the injection timing is gradually delayed until the injection timing is shifted to the third predetermined injection stage. Accordingly, abrupt output change of the engine 14 can be suppressed by the switching of the number of fuel injections and the drivability is improved. Moreover, performing the fuel injection twice can improve the vaporization efficiency due to the effect of latent heat of vaporization.

Since the injection amount map 78 includes the two-time injection amount map 78*a* used when the fuel injection is performed twice and the one-time injection amount map 78*b* used when the fuel injection is performed once, the fuel injection can be performed in an appropriate fuel injection amount corresponding to the number of fuel injections.

The first fuel injection amount TIM2 of the two-time fuel injection mode is calculated by multiplying the basic injection amount TIMAP2 by the environment correction coefficient K_TOTAL and the predetermined injection ratio RTI, the basic injection amount TIMAP2 obtained from the two-time injection amount map 78*a* on the basis of the throttle opening degree TH and the engine speed SE in the first predetermined injection stage. Accordingly, it is possible to calculate the first fuel injection amount TIM2 in which the basic injection amount TIMAP2 is corrected and which includes the ratio to the second fuel injection amount TIM3.

The second fuel injection amount TIM3 corresponding to changes in the throttle opening degree TH and the like can be calculated by subtracting the first fuel injection amount TIM2 from the value obtained by multiplying the basic injection amount TIMAP2 by the environment correction coefficient K_TOTAL, the basic injection amount TIMAP2 obtained from the two-time injection amount map 78*a* on the basis of the throttle opening degree TH and the engine speed NE in the second predetermined injection stage.

The predetermined number of cycles is one cycle, the injection timing is advanced by one injection stage every cycle in the two-time fuel injection transition mode, and the injection timing is delayed by one injection stage every cycle in the one-time fuel injection transition mode. Thus, it is possible to further suppress abrupt change in the output of the engine 14 and change the output linearly.

After the crank reference position is determined by performing the simultaneous injection at the start of the engine 14, the injection stages are determined by performing the fixed injection once. Then, after the injection stages are determined, the injection mode is set to the one-time fuel injection mode. Accordingly, whether to perform the fuel injection twice can be determined after the injection stages are determined and the injection mode is set to the one-time fuel injection mode.

When the crank reference position becomes undeterminable after the simultaneous injection, the simultaneous injection and the fixed injection are performed again to determine the injection stages. Accordingly, fail-safety can be achieved.

In the aforementioned embodiment, in the two-time fuel injection transition mode, the injection timing is advanced by one injection stage every cycle. However, the injection timing may be advanced by a predetermined number of injection stages (for example, two injection stages) every predetermined number of cycles (for example, every two cycles). Moreover, in the one-time fuel injection transition mode, although the injection timing is delayed by one injection stage every cycle, the ignition point may be delayed by a predetermined number of injection stages every predetermined number of cycles.

The embodiment of the present invention has been described above, but the technical scope of the present invention is not limited to the scope described in the above embodiment. It is apparent to those skilled in the art that various modifications or improvements can be made to the above embodiment. Embodiments to which such modifications or improvements are made can be also included in the technical scope of the present invention, as is apparent from the description of the scope of claims. Moreover, reference numerals in parentheses in the scope of claims are attached in accordance with the reference numerals in the attached drawings to facilitate the understanding of the present invention. It should not be interpreted that the present invention is limited by the elements to which the reference numerals are attached.

A fuel injection control system (10) of the embodiment of the present invention has the following aspects.

A fuel injection control system (10) according to a first aspect of the embodiment includes a fuel injection device (12) configured to inject fuel; a fuel injection control part (76) configured to calculate a fuel injection amount of the fuel to be injected from the fuel injection device (12), by using an injection amount map (78), and drive the fuel injection device (12) to make the fuel injection device (12) inject the fuel in the calculated fuel injection amount; a fuel injection number determining part (72) configured to determine whether the number of fuel injections in one cycle of an engine having a predetermined number of divided injection stages is to be one or two on the basis of a throttle opening degree (TH) and an engine speed (NE); and a fuel injection mode setting part (74) configured to, in a case where the number of fuel injections determined by the fuel injection number determining part (72) is switched from one to two, set an injection mode to a two-time fuel injection transition mode in which an injection timing is gradually advanced every predetermined number of cycles with the number of fuel injections in one cycle kept at one; and when the injection timing is shifted to a first predetermined injection stage, set the injection mode to a two-time fuel injection mode in which the number of fuel injections in one cycle is set to two, the first injection timing is kept in the first predetermined injection stage and an additional injection timing is set in a second predetermined injection stage after the first predetermined injection stage, and in a case where the number of fuel injections determined by the fuel injection number determining part (72) is switched from two to one, set the injection mode to a one-time fuel injection transition mode in which the number of fuel injections in one cycle is set to one and the injection timing is gradually delayed from the first predetermined injection stage every predetermined number of cycles; and set the injection mode to a one-time fuel injection mode when the injection timing returns to a third predetermined injection stage. The fuel injection control part (76) calculates the fuel injection amount at each of the injection timing and the additional injection timing which corresponds to the injection mode set by the fuel injection mode setting part (74), and makes the fuel injection device (12) inject the fuel in the calculated fuel injection amount.

In the fuel injection control system, according to a second aspect of the embodiment, the injection amount map (78) includes a two-time injection amount map (78a) used when the fuel injection is performed twice and a one-time injection amount map (78b) used when the fuel injection is performed once.

In the fuel injection control system, according to a third aspect of the embodiment, the fuel injection control part (76) calculates a first fuel injection amount (TIM2) for a first injection of the two-time fuel injection mode by multiplying a basic injection amount (TIMAP2) by an environment correction coefficient (K_TOTAL) and a predetermined injection ratio (RTI), the basic injection amount (TIMAP2) obtained from the two-time injection amount map (78a) on the basis of the throttle opening degree (TH) and the engine speed (NE) detected at the injection timing.

In the fuel injection control system, according to a fourth aspect of the embodiment, the fuel injection control part (76) calculates a second fuel injection amount (TIM3) for a second injection of the two-time fuel injection mode by subtracting the first fuel injection amount (TIM2) from a value obtained by multiplying the basic injection amount (TIMAP2) by the environment correction coefficient (K_TOTAL), the basic injection amount (TIMAP2) obtained from the two-time injection amount map (78a) on the basis of the throttle opening degree (TH) and the engine speed (NE) detected at the additional injection timing.

In the fuel injection control system, according to a fifth aspect of the embodiment, the predetermined number of cycles is one cycle, the injection timing is advanced by one injection stage every cycle in the two-time fuel injection transition mode, and the injection timing is delayed by one injection stage every cycle in the one-time fuel injection transition mode.

In the fuel injection control system, according to a sixth aspect of the embodiment, the fuel injection control system (10) further includes an engine starting part (70) configured to determine a crank reference position by performing a simultaneous injection at start of the engine and then determine the injection stages by performing a fixed injection once, and the fuel injection mode setting part (74) sets the injection mode to the one-time fuel injection mode after the engine starting part (70) determines the injection stages.

In the fuel injection control system, according to a seventh aspect of the embodiment, when the crank reference position becomes undeterminable after the simultaneous injection, the engine starting part (70) performs the simultaneous injection and the fixed injection again to determine the injection stages.

According to the first aspect of the embodiment of the present invention, in the case where the number of fuel injections is switched from one to two, the injection timing is gradually advanced with the number of fuel injections kept at one, until the injection timing is shifted to the first predetermined injection stage. Then, the number of fuel injections is set to two when the injection timing is shifted to the first predetermined injection stage. In the case of switching the number of fuel injections from two to one, the number of fuel injections is set to one and the injection timing is gradually delayed until the injection timing is shifted to the third predetermined injection stage. Accordingly, abrupt output change of the engine can be suppressed by the switching of the number of fuel injections and the drivability is improved. Moreover, performing the fuel injection twice can improve vaporization efficiency due to an effect of latent heat of vaporization.

According to the second aspect of the embodiment of the present invention, the injection amount map includes the two-time injection amount map used when the fuel injection is performed twice and the one-time injection amount map used when the fuel injection is performed once. Hence, the fuel injection can be performed in an appropriate fuel injection amount corresponding to the number of fuel injections.

According to the third aspect of the embodiment of the present invention, the first fuel injection amount of the two-time fuel injection mode is calculated by multiplying the basic injection amount by the environment correction coefficient and the predetermined injection ratio, the basic injection amount obtained from the two-time injection amount map on the basis of the throttle opening degree and the engine speed at the injection timing (first predetermined injection stage). Thus, it is possible to calculate the first fuel injection amount in which the basic injection amount is corrected and which includes the ratio to the second fuel injection amount.

According to the fourth aspect of the embodiment of the present invention, the second fuel injection amount corresponding to changes in the throttle opening degree and the like can be calculated by subtracting the first fuel injection amount from the value obtained by multiplying the basic injection amount by the environment correction coefficient, the basic injection amount obtained from the two-time injection amount map on the basis of the throttle opening degree TH and the engine speed NE at the additional injection timing (second predetermined injection stage).

According to the fifth aspect of the embodiment of the present invention, the predetermined number of cycles is one cycle, the injection timing is advanced by one injection stage every cycle in the two-time fuel injection transition mode, and the injection timing is delayed by one injection stage every cycle in the one-time fuel injection transition mode. Thus, it is possible to further suppress abrupt change in the output of the engine 14 and change the output linearly.

According to the sixth aspect of the embodiment of the present invention, the fuel injection control system further includes the engine starting part configured to determine the crank reference position by performing the simultaneous injection at the start of the engine and then determine the injection stages by performing the fixed injection once, and the fuel injection mode setting part sets the injection mode to the one-time fuel injection mode after the engine starting part determines the injection stages. Hence, whether to perform the fuel injection twice can be determined after the injection stages are determined and the injection mode is set to the one-time fuel injection mode.

According to the seventh aspect of the embodiment of the present invention, when the crank reference position becomes undeterminable after the simultaneous injection, the simultaneous injection and the fixed injection are performed again to determine the injection stages. Hence, fail-safety can be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel injection control system comprising:
an engine speed detector configured to detect an engine speed (NE);
a throttle opening degree detector configured to detect a throttle opening degree (TH);
a fuel injection device configured to inject fuel;
a fuel injection controller configured to calculate, based on an injection amount map, a fuel injection amount of the fuel to be injected from the fuel injection device and configured to control the fuel injection device to inject the fuel according to the calculated fuel injection amount;
a fuel injection number determining device configured to determine based on the throttle opening degree (TH) detected by the throttle opening degree detector and the engine speed (NE) detected by the engine speed detector whether a frequency of fuel injections during one cycle of an engine is to be one or two, the one cycle of the engine having a predetermined number of divided injection stages including a first predetermined injection stage, a second predetermined injection stage after the first predetermined injection stage, and a third predetermined injection stage; and
a fuel injection mode setting device,
in a case where the frequency of fuel injections determined by the fuel injection number determining device is switched from one to two, which is configured to set an injection mode to a two-time fuel injection transition mode in which an injection timing is gradually advanced every predetermined number of cycles while the frequency of fuel injections is kept at one and which is configured to set the injection mode from the two-time fuel injection transition mode to a two-time fuel injection mode, when the injection timing is shifted to the first predetermined injection stage, in which the frequency of fuel injections is set to two so that the first injection timing is kept in the first predetermined injection stage and an additional injection timing is set in the second predetermined injection stage after the first predetermined injection stage, and
in a case where the frequency of fuel injections determined by the fuel injection number determining device is switched from two to one, the fuel injection mode setting device being configured to set the injection mode to a one-time fuel injection transition mode in which the frequency of fuel injections is set to one and the injection timing is gradually delayed from the first predetermined injection stage every predetermined number of cycles and the fuel injection mode setting device being configured to set the injection mode from the one-time fuel injection transition mode to a one-time fuel injection mode when the injection timing returns to the third predetermined injection stage; and
the fuel injection controller being configured to control the fuel injection device according to the fuel injection mode set by the fuel injection mode setting device.

2. The fuel injection control system according to claim 1, wherein the injection amount map includes a two-time injection amount map used when the fuel injection is performed twice and a one-time injection amount map used when the fuel injection is performed once.

3. The fuel injection control system according to claim 2, wherein the fuel injection controller calculates a first fuel injection amount (TIM2) for a first injection of the two-time fuel injection mode by multiplying a basic injection amount (TIMAP2) by an environment correction coefficient (K_TOTAL) and a predetermined injection ratio (RTI), the basic injection amount (TIMAP2) obtained from the two-time injection amount map based on the throttle opening degree (TH) detected by the throttle opening degree detector at the injection timing and the engine speed (NE) detected by the engine speed detector at the injection timing.

4. The fuel injection control system according to claim 3, wherein the fuel injection controller calculates a second fuel injection amount (TIM3) for a second injection of the two-time fuel injection mode by subtracting the first fuel injection amount (TIM2) from a value obtained by multiplying the basic injection amount (TIMAP2) by the environment correction coefficient (K_TOTAL), the basic injection amount (TIMAP2) obtained from the two-time injection amount map based on the throttle opening degree (TH) detected by the throttle opening degree detector at the additional injection timing and the engine speed (NE) detected by the engine speed detector at the additional injection timing.

5. The fuel injection control system according to claim 2, wherein the fuel injection controller calculates a third fuel injection amount (TIM1) for an injection of the one-time fuel injection mode, the two-time fuel injection transition mode, and the one-time fuel injection transition mode by multiplying a basic injection amount (TIMAP1) by an environment correction coefficient (K_TOTAL), the basic injection amount (TIMAP1) obtained from the one-time injection amount map based on the throttle opening degree (TH) detected by the throttle opening degree detector at the injection timing and the engine speed (NE) detected by the engine speed detector at the injection timing.

6. The fuel injection control system according to claim 1, wherein
   the predetermined number of cycles is one cycle,
   the injection timing is advanced by one injection stage every cycle in the two-time fuel injection transition mode, and
   the injection timing is delayed by one injection stage every cycle in the one-time fuel injection transition mode.

7. The fuel injection control system according to claim 1, further comprising an engine starting device configured to determine a crank reference position by performing a simultaneous injection at start of the engine and then determine the injection stages by performing a fixed injection once, wherein
   the fuel injection mode setting device sets the injection mode to the one-time fuel injection mode after the engine starting device determines the injection stages.

8. The fuel injection control system according to claim 7, wherein, when the crank reference position becomes undeterminable after the simultaneous injection, the engine starting device performs the simultaneous injection and the fixed injection again to determine the injection stages.

9. The fuel injection control system according to claim 1, wherein the second predetermined injection stage is after the third predetermined injection stage.

* * * * *